Patented Apr. 13, 1948

2,439,457

UNITED STATES PATENT OFFICE 2,439,457

ALKYLATION OF BENZENE BY LONG CHAIN POLYMERIC OLEFINS USING SULFURIC ACID CATALYST

John Joseph Donleavy, Montclair, N. J., and Manuel Mannheim Baizer, Flushing, N. Y., assignors to Allied Chemical & Dye Corporation, a corporation of New York No Drawing. Application February 28, 1947, Serial No. 731,728

7 Claims. (Cl. 260—671)

This invention relates to the manufacture of alkyl-substituted aromatic compounds and particularly to the manufacture of alkyl-substituted mononuclear aromatic hydrocarbons by condensation of long chain polymeric olefins with benzene to produce products useful as solvents and as intermediates for the manufacture of organic detergents, wetting agents, softening agents and the like.

In the past it has been proposed to condense lower olefins, such as propylene and butylene, with polynuclear aromatic hydrocarbons, such as naphthalene and methyl naphthalene, employing sulfuric acid as a condensing agent to produce alkyl aromatic hydrocarbons. It also has been proposed to condense long chain olefins with mono-nuclear hydrocarbons, such as benzene, employing aluminum chloride as a condensing agent to form alkylated benzenes.

It is an object of the present invention to produce products useful as solvents, for example for insecticides, and as intermediates for the manufacture of surface-active agents such as detergents and the like, and softening agents. It is a further object of the invention to provide a process for the manufacture of long chain alkyl aromatic compounds from long chain olefins and benzene in substantially higher yields than with previously known processes and with minimum depolymerization of polymeric olefins employed in the condensation. A further object of the invention is to reduce the proportion of polymeric long chain olefins entering into the formation of short chain alkyl aromatic condensation products. A further object of the invention is to provide an alkylation process suitable for conversion of polymeric olefins and benzene to high-boiling alkylated aromatic hydrocarbons especially valuable for use as intermediates in the manufacture of alkyl aromatic sulfonate detergents, wetting agents, cleansing agents, and the like. A further object of the invention is to provide a simple alkylation procedure capable of producing valuable alkylates which may be used without substantial purification to provide sulfonates of excellent surface-active properties. Further objects will be apparent from the following general description and specific examples.

In accordance with the present invention condensation of benzene and an olefin containing between 8 and 20 carbon atoms is effected by adding the olefin in not over one hour to a dispersion of the benzene and a sulfuric acid condensing agent while the temperature of the dispersion is maintained between 5° C. and 40° C. We have found that these conditions are essential for effective alkylation without depolymerization or cracking when polymeric long chain olefins, which are notably susceptible to these reactions, are employed. Long chain olefin mixtures obtained by polymerization processes well known in the petroleum industry, for instance butylene polymerization, are of this type. Suitable molecular ratios of benzene to olefin are between about ½ and about 2.0 and suitable ratios of sulfuric acid to olefin are at least 2.0. When these conditions and proportions are employed, high yields of long chain alkyl aromatic hydrocarbons are obtainable and very little decomposition or cracking and concomitant formation of short chain alkyl aromatic hydrocarbons results.

In its preferred form the invention comprises adding a long chain olefin mixture comprising olefins ($C_nH_{2n}$) with between 12 and 14 carbon atoms per molecule in a period of 10 to 20 minutes to a well dispersed suspension or an emulsion of benzene in 88% to 98% sulfuric acid at 5° to 40° C., the reactants being employed in the proportions of 0.7 to one mol of benzene and 3 to 4 mols of $H_2SO_4$ per mol of olefins, and thereafter agitating the resulting reaction mixture for one to two hours.

If the alkylation is carried out under conditions outside of the field covered by the present invention, as outlined above, a smaller yield of the desired alkylate is obtained along with a larger yield of lower alkyl aromatic by-products resulting from depolymerization, cracking, or scission of the olefins and subsequent combination of the olefin fragments with the aromatic compound. The increased formation of these by-products is reflected in an increased proportion of low-boiling material in the final product. In the manufacture of alkyl benzenes suitable for sulfonation to provide effective sulfonate detergents, alkylates which boil above 110° C. at 10 mm. of mercury absolute pressure are desired. Products boiling below 110° C. at this pressure are relatively unsuitable for use as detergent intermediates. When products are prepared in accordance with the teachings of the present invention, the proportion of low-boiling material is insufficient to reduce substantially the detergency of sulfonation products prepared from them. Consequently it is unnecessary to separate the low-boiling alkylates in order to prepare sulfonate detergents having detergency equal to that of the sulfonates prepared from high boiling alkylate alone. In fact, good detergents can be obtained directly from the alkylation mixture without separating even the sulfuric acid.

In the folowing examples the effectiveness of the alkylate products has been expressed in terms of the weight ratio of alkylate boiling above 110° C. at 10 mm. of mercury absolute pressure (which may include a small proportion of higher polymers of the olefinic starting material) to alkylate boiling below this temperature, designated the "E ratio." While the E ratio is not a direct measure of prospective detergent effectiveness, it provides an adequate comparison for the closely related products prepared in these examples.

*Example 1.*—Three mols of (96%) sulfuric acid and two mols of benzene were stirred at 35° C. until they were well emulsified. One mol of a polymeric olefin mixture with an average carbon content between 13 and 14 atoms per molecule (boiling range 200° to 240° C., specific gravity at 15° C. 0.809) was run into the sulfuric acid-benzene mixture. When all of the olefin had been added, stirring was continued at the same temperature for 1 to 7 hours as indicated in the table below. Agitation was then stopped and the mixture was allowed to stratify. The sulfuric acid layer was drawn off and the hydrocarbon layer washed with 2 mols of $H_2SO_4$, then washed with 21 mols of $H_2O$, then with a little 10% NaOH and finally with more $H_2O$. It was dried with $CaCl_2$ and then was topped to remove unreacted benzene and then distilled in vacuo to determine the proportion of alkylate boiling below 110° C. at 10 mm. of mercury and the proportion boiling above this temperature.

The following table correlates the results obtained with the conditions employed.

Table 1

| Run | A | B | C | D |
|---|---|---|---|---|
| Time addn. olefins (min.) | 180 | 180 | 45 | 12 |
| Total reaction time (min.) | 420 | 210 | 210 | 60 |
| Hydrocarbon layer (dry) (parts by weight) | 96.4 | 93.6 | 113.0 | 125.4 |
| (1) Unchanged benzene (parts by weight) | 31.7 | 28.8 | 27.0 | 29.0 |
| (2) Alkylate off below 110° C. at 10 mm | 30.0 | 29.8 | 22.6 | 26.4 |
| (3) Alkylate off above 110° C. at 10 mm | 32.6 | 35.0 | 63.4 | 70.0 |
| E Ratio | 1.09 | 1.18 | 2.80 | 2.65 |

From these results it is apparent that by employing a rate of addition such that all of the olefin was added in 12 minutes or 45 minutes a ratio of desired alkylate to undesired alkylate was obtained more than double that obtained when the olefin was added in a 3-hour period.

*Example 2.*—Benzene in varying proportions was thoroughly mixed with 3 mols of sulfuric acid (96%) and to the well dispersed mixture maintained at 35° C. one mol of olefin of the type employed in Example 1 was added in a period of between 10 and 15 minutes. The mixture was then agitated at 35° C. to provide a total reaction time of one hour. The mixture was stratified and $H_2SO_4$ decanted off. The product was washed with ½ mol of 96% $H_2SO_4$, then with 5 mols of water, ½ mol of NaOH (as 5% solution) and again with 5 mols of water. The product was dried with $MgSO_4$, topped and distilled as in Example 1.

The following table shows the effect of varying the ratio of olefin to benzene:

Table 2

| Run | E | F | G | H |
|---|---|---|---|---|
| Molar ratio benzene:olefin | 3 | 1.5 | 1 | 0.75 |
| Molar ratio $H_2SO_4$: benzene | 1 | 2 | 3 | 4 |
| E Ratio | 1.96 | 3.78 | 4.10 | 4.27 |

*Example 3.*—Sulfuric acid and benzene were thoroughly mixed as in the preceding examples and maintained at 35° C. while olefin of the same composition as previously employed was added in a period of 10 minutes. The mixture was agitated to provide a total reaction time of 90 minutes and then settled; the sulfuric acid was drawn off and the alkylate was distilled as in the preceding examples. In this group of runs the molar ratio of benzene to olefin was maintained constant at 0.71 and the molar ratio of sulfuric acid to olefin was varied as shown in Table 3 below, which correlates the ratio of sulfuric acid to olefin with the E ratio.

Table 3

| Runs | I | J | K | L |
|---|---|---|---|---|
| Molar ratio $H_2SO_4$: olefin | 1.5 | 2.0 | 3.0 | 4.0 |
| Molar ratio $H_2SO_4$: benzene | 2.1 | 2.8 | 4.2 | 5.6 |
| E Ratio | 2.04 | 4.8 | 8.8 | 9.5 |

*Example 4.*—This example illustrates the typical manufacture of a sodium alkyl benzene sulfonate detergent in solid form, employing the features of the invention. 102 parts of benzene and 535 parts of 93% sulfuric acid are charged into a lead-lined tank provided with cooling coils and agitator and the mixture is stirred until the benzene is well emulsified. 248 parts of olefinic reagent of the same composition as employed in Example 1 (boiling range 200° to 240° C., specific gravity 0.809, bromine number 84.6) is added in the course of 15 minutes while the mixture is agitated and maintained at approximately 25°–35° C. When all of the olefin has been added, circulation of cooling fluid is stopped and the mixture is stirred at 35° C. for one hour. Cooling fluid is then again circulated and the mixture is settled at a temperature of 20°–30° C. for about 1½ hours to separate sulfuric acid from the organic liquid.

After removal of the sulfuric acid, the organic liquid is agitated rapidly and 550 parts of 20% oleum is added in about two hours while the temperature is maintained between 20° and 30° C. When all of the oleum has been added, the temperature is permitted to rise to 50° C. and the mixture is agitated at this temperature for three hours. It is then cooled to room temperature and introduced into about 1,680 parts of aqueous 25% NaOH solution which is well agitated and cooled to maintain a temperature of 60°–70° C. during the addition of the sulfonic acid. When all of the sulfonic acid has been added, the pH of the solution is adjusted to approximately 8 and the resultant substantially neutral mixture is run directly onto a drum drier maintained at 100°–110° C. to dry the product. The dry product is a very light tan solid containing about 36% sodium alkyl benzene sulfonates and 64% sodium sulfate. An aqueous solution containing ½% of the product is practically colorless and exhibits a Draves test of about 39 seconds and a surface tension of about 33 dynes per centimeter.

The method of neutralizing the alkyl benzene sulfonic acid to form the sodium sulfonate as described in the preceding example is the subject matter of Baizer U. S. patent application Serial No. 731,727, filed February 28, 1947, and entitled "Manufacture of alkyl aromatic sulfonates."

In place of the 93% sulfuric acid employed as alkylating agent in the preceding example other concentrated sulfuric acid condensing agents containing 88% to 98% $H_2SO_4$ may be employed; for example, similar results have been obtained using a waste sulfuric acid comprising 95% $H_2SO_4$ and 3% fluorine present as boron trifluoride. In place of sodium hydroxide an equivalent quantity of sodium carbonate or other alkaline sodium compound may be employed for the neutralization to form the sodium salt of the sulfonic acid.

We claim:

1. In the manufacture of long chain alkyl aromatic compounds by condensation of olefinic reagent comprising a scission-susceptible olefin containing between 8 and 20 carbon atoms with benzene, the improvement which comprises adding the olefinic reagent in a period between about ten minutes and one hour to a dispersion of benzene in a sulfuric acid condensing agent at a temperature between about 5° C. and about 40° C. in amount corresponding to between about ½ and about 2 mols of benzene and at least 2 mols of sulfuric acid per mol of olefin.

2. In the manufacture of long chain alkyl aromatic compounds by condensation of olefinic reagent comprising a scission-susceptible olefin containing between 8 and 20 carbon atoms with benzene, the improvement which comprises adding the olefinic reagent in a period between about 10 and about 20 minutes to a dispersion of benzene in a concentrated sulfuric acid condensing agent at a temperature between about 5° C. and about 40° C. in amount corresponding to between about ½ and about 2 mols of benzene and between about 3 and about 4 mols of sulfuric acid per mol of olefin and agitating the mixture for at least one hour.

3. A process for making long chain alkyl aromatic compounds which comprises adding an olefinic reagent comprising a mixture of scission-susceptible olefins having molecular carbon contents between 12 and 14 carbon atoms to a rapidly agitated dispersion of benzene in a concentrated sulfuric acid condensing agent in amount corresponding to between about 0.7 and about one mol of benzene and between about 3 and about 4 mols of sulfuric acid per mol of olefin in a period between about 10 and about 20 minutes while maintaining the temperature of the dispersion between about 5° C. and about 40° C. and agitating the resulting mixture within this temperature range for between one and two hours.

4. In the manufacture of long chain alkyl aromatic compounds by condensation of olefinic reagent comprising scission-susceptible olefins with molecular carbon contents between 12 and 14 carbon atoms, said reagent boiling principally between 200° C. and 240° C. at atmospheric pressure and having a specific gravity of about 0.8 and a bromine number of about 85, the improvement which comprises adding the olefinic reagent gradually in a period between about 10 and about 20 minutes to a dispersion of benzene in 88% to 98% sulfuric acid at a temperature between about 5° C. and about 40° C. in amount corresponding to between about ½ and about 2 mols of benzene and at least 2 mols of sulfuric acid per mol of olefin.

5. The process defined by claim 4, which comprises the further steps of agitating the resulting reaction mixture between 5° C. and 40° C. for at least one hour after addition of the olefinic reagent and then mechanically separating sulfuric acid from the reaction mixture.

6. A process for making a long chain alkyl benzene mixture of especial value for manufacture of sulfonate detergents, which comprises adding an olefinic reagent, comprising scission-susceptible olefins with molecular carbon contents between 12 and 14 carbon atoms, said reagent boiling principally between 200° C. and 240° C. at atmospheric pressure and having a specific gravity of about 0.8 and a bromine number of about 85, to a rapidly agitated dispersion of benzene in 88% to 98% sulfuric acid in amount corresponding to about one mol of benzene and about four mols of sulfuric acid per mol of olefin in a period between 10 and 20 minutes while maintaining the temperature of the dispersion between about 5° C. and about 40° C. and thereafter continuing to agitate the mixture within this temperature range for between one and two hours.

7. The process of claim 4 which comprises the further step of mechanically separating sulfuric acid from the resulting reaction mixture.

JOHN JOSEPH DONLEAVY.
MANUEL MANNHEIM BAIZER.

REFERENCES CITED

The following references are of record in the file of this patent:

UNITED STATES PATENTS

| Number | Name | Date |
| --- | --- | --- |
| 2,072,153 | Bruson et al. | Mar. 2, 1937 |
| 2,396,144 | Anderson et al. | Mar. 5, 1946 |